Dec. 2, 1958 W. P. ROSE ET AL 2,862,582
BRAKE DEVICE
Filed May 12, 1955
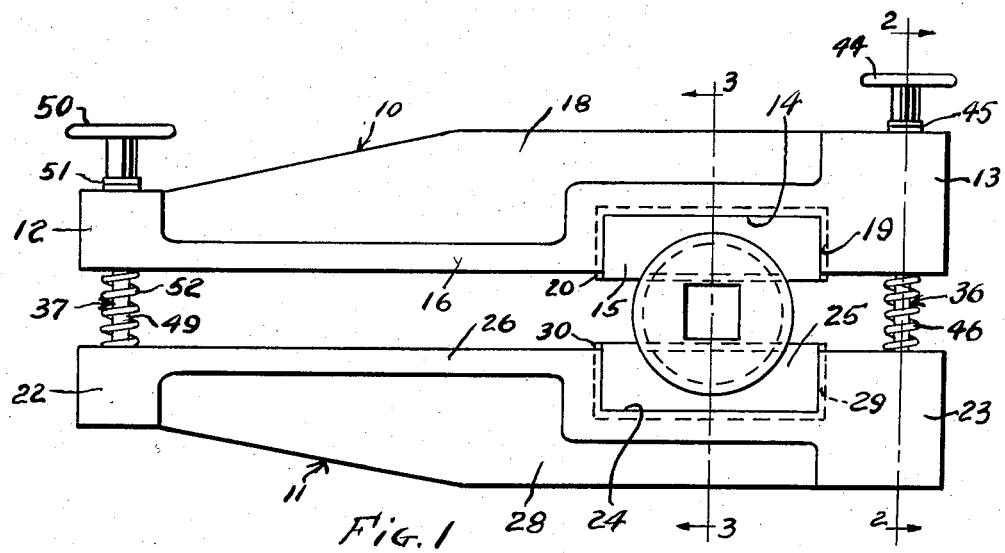
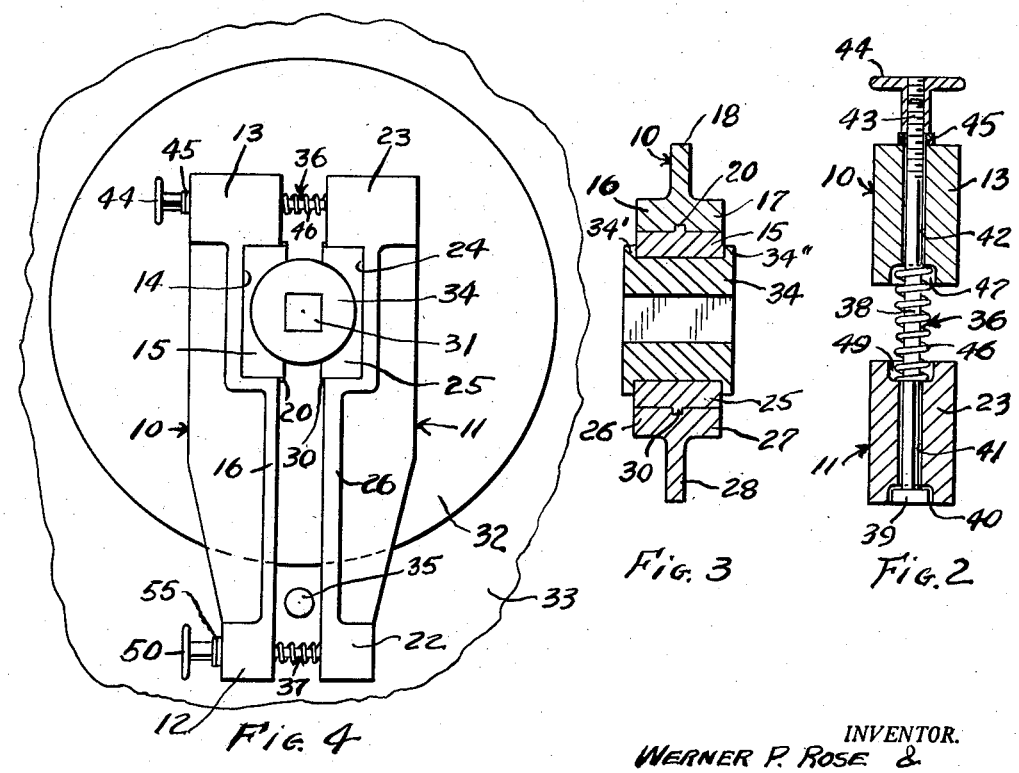
INVENTOR.
WERNER P. ROSE &
BY ROBERT E. KUHN
L. S. Saulsbury
ATTORNEY United States Patent Office 2,862,582
Patented Dec. 2, 1958

2,862,582
BRAKE DEVICE

Werner P. Rose, Oakland, and Robert E. Kuhn,
Saddle River, N. J.

Application May 12, 1955, Serial No. 507,900

1 Claim. (Cl. 188—75)

This invention relates to a brake device for use with cloth treating machines to frictionally restrain the cloth rolls against free rotation with respect thereto.

It is the principal object of the present invention to provide an independent brake device adapted for frictionally restraining the turning movement of cloth rolls of cloth-treating machines which is provided with brake blocks of carbon and graphite-like material to increase the life of such brakes and to withstand the higher speeds of rotation of cloth rolls with the modern cloth-treating machines and to replace the wood brake devices which have proven inadequate for use with such highspeed machines.

It is another object of the present invention to provide a brake device for use with cloth-treating machines wherein the braking elements, with which the spool driven by the cloth roll spindle frictionally engages, will be solid and of a self-supporting structure and opposing which can be replaced and removed from frame members that carry the elements and which adjustably secure the elements in predetermined friction-tight manner upon the spool to obtain the desired braking effect.

It is still another object of the invention to provide a braking device for cloth-treating machines in which the frame members are formed of lightweight metal castings instead of wood as in the case of prior brake devices in order to prevent splintering or destruction of the brake members with continued use and under the heavy duty of the more speedy cloth-treating machines of the present day.

It is a further object of the invention to provide a brake device wherein the braking members have pockets for receiving the carbon blocks in which are provided longitudinally and outwardly extending grooves and the carbon blocks tongues or ridges provided on the underside and ends of the block whereby the blocks will be restrained against lateral displacement from the brake members.

Other objects of the invention are, to provide a brake device for cloth-treating machines with the above objects in mind which is of simple construction, inexpensive to manufacture, has a minimum number of parts, is easy to assemble upon the cloth roll spindle, is easy to adjust to different frictional engagement with the metal spool carried by the cloth roll, light in weight, compact, durable, has long life, economical, efficient and effective in operation.

For other objects and a better understanding of the invention, reference may be had to the following detailed description taken in connection with the accompanying drawing, in which:

Figure 1 is an enlarged elevational view of the brake device embodying the features of the present invention;

Fig. 2 is a vertical sectional view of the device taken at one end of the device and as viewed on line 2—2 of Fig. 1;

Fig. 3 is a vertical sectional view of the brake device taken through the spool and carbon blocks at the point at which the device is connected to the spindle of the cloth roll, this view being taken generally on line 3—3 of Fig. 1; and Fig. 4 is an elevational view of the cloth roll and of a projection on the machine frame for restraining the brake device against rotation.

Referring now to the figures, 10 and 11 respectively represent a carbon block carrying member formed of aluminum castings. The member 10 has boss or thickened portions 12 and 13 on the respective supporting ends thereof, and a non-circular recess 14 into which a carbon or graphite brake block 15 is disposed. Running between the bosses 12 and 13 and about the recess 14 and along the inner face of the member 10 are ribs 16 and 17 and a web 18 to make for a rigid member which will be strong, yet light in weight.

Within the recess 14 and running along the middle and ends thereof is a continuous groove 19 for receiving a rib or tongue 20 provided upon the inner face and outer ends of the carbon block 15. This rib 20, when fitted in the groove 19, positively retains the carbon block 15 against lateral displacement from the recess 14 and the carrying member 10.

The opposing carrying member 11 is similarly formed and has bosses 22 and 23 on the respective supporting ends of the same and a recess 24 for containing an opposing carbon or graphite block 25. Ribs 26 and 27 and web 28 extend between the bosses 22 and 23 and about the recess 24 to reinforce the member 11.

Within the recess 14 and running along the middle and ends thereof, is a continuous groove 29 for receiving a rib or tongue 30. This rib positively locks the carbon block 25 against lateral displacement from the recess 24 and the carrying member 11. The recesses in the members are closer to one end of the device than to the other end of the device thereby to provide a more effective work arm for holding the device against rotation on the machine in a manner to be later described.

The brake device is assembled upon a spindle shaft 31 of a cloth roll 32, Fig. 4. This spindle shaft is of square section and is journalled upon the machine frame 33. A brake drum 34 is fixed upon the shaft 31. The brake device surrounds this brake drum and the carbon blocks have concaved braking surfaces that engage the sides of the drum 34. The ends of the drum 34 are flanged as indicated at 34' and 34" so as to hold the brake device against longitudinal displacement from the shaft 31.

To keep the brake device from turning and to effect braking action, a projection 35 protrudes from the machine frame 33 and extends between the members 10 and 11 at a location remote from the shaft 31 and near to the end bosses 12 and 22 thereof.

The carrying members 10 and 11 are connected together by adjustable bolt assemblies 36 and 37 extending respectively through the bosses at the opposite sides of the carrying members. The adjustable bolt assembly 36 extends through the large bosses 13 and 23 and comprises a long bolt 38 having a square head 39 that seats in a square opening 40 in the boss 23 of the member 11, Fig. 2, and its shank extends through a hole 41 in the boss 23 and an aligned hole 42 in the boss 13 of the member 10. The bolt shank is threaded on its other end as indicated at 43. A hand nut 44 is adjustable upon the shank threads 43 and against washers 45 and boss 13 to tighten the carrying members 10 and 11 and the carbon blocks upon the brake drum 34. A compression spring 46 surrounds the bolt shank and its ends are respectively retained in counterbored recesses 47 and 48 in the respective bosses 13 and 23. This spring 46 serves to expand the members 10 and 11 as the hand nut 44 and bolt assembly 36 are released.

The bolt assemblies are tightened to fix the brake device upon the brake drum 34 to regulate the friction grip of the carbon blocks upon the drum to the amount of braking action that is desired. As the brake device is turned against the projection 35, this braking action will be maintained.

It should be apparent that there has been provided by this invention a brake device for use with high speed cloth-treating machines which employ carbon friction blocks for effecting braking action upon the brake drums, instead of the usual wooden brake members used heretofore, and that a brake device having long life has been provided.

It should also be apparent that a brake device has been provided for use with cloth-treating machines wherein friction blocks are accurately trued and retained in carrying members made of lightweight metal and while being of durable and long-life material themselves and adapted to withstand the high speeds of the new cloth-treating machines for a long time, may be easily replaced by other blocks and using the same carrying members, and thereby making for an economical construction.

While various changes may be made in the detail construction, it shall be understood that such changes shall be within the spirit and scope of the present invention as defined by the appended claim.

What is claimed is:

A brake device for resisting the rotation of a roll of a cloth treating machine comprising friction block carrying members, each of said members having a non-circular block receiving recess with a groove therein, and boss portions on the respective opposite ends of the member, the recess of the member lying adjacent to the boss at one end of the member, a friction block having a rib fitting into the groove of its carrying member and the boss at the other end lying more removed from said recess and thereby providing an extended anchor arm, a web and reinforcing ribs on the opposite sides thereof running between the boss portions and under and about the recess to provide a lightweight reinforced carrying member, and adjustable bolt assemblies disposed in the respective opposite ends of the carrying members and in the boss portions of the members.

References Cited in the file of this patent

UNITED STATES PATENTS

| | | |
|---|---|---|
| 1,276,792 | Morse | Aug. 27, 1918 |
| 1,470,007 | Jenckes | Oct. 9, 1923 |
| 1,588,039 | Monosmith | June 8, 1926 |
| 1,778,570 | Soresi | Oct. 14, 1930 |
| 2,388,123 | Conradty | Oct. 30, 1945 |
| 2,646,081 | Ritsky | July 21, 1953 |

FOREIGN PATENTS

| | | |
|---|---|---|
| 274,197 | Germany | May 15, 1914 |
| 315,536 | Great Britain | July 18, 1929 |
| 624,614 | Great Britain | June 14, 1949 |

OTHER REFERENCES

Ser. No. 340,223, Zollner (A. P. C.), published May 18, 1943.